United States Patent
Sugimoto

(10) Patent No.: US 10,812,399 B2
(45) Date of Patent: Oct. 20, 2020

(54) COMMUNICATION METHOD, COMMUNICATION APPARATUS, AND PROGRAM FOR REDUCING DELAY TIME OF TRANSMISSION CONTROL PROTOCOL (TCP) TRANSMISSION PROCESSING

(71) Applicant: CANON KABUSHIKI KAISHA, Tokyo (JP)

(72) Inventor: Shun Sugimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 15/904,852

(22) Filed: Feb. 26, 2018

(65) Prior Publication Data
US 2018/0248808 A1 Aug. 30, 2018

(30) Foreign Application Priority Data
Feb. 28, 2017 (JP) .................................. 2017-035935

(51) Int. Cl.
*H04L 12/807* (2013.01)
*H04L 29/06* (2006.01)
*H04L 29/08* (2006.01)
*H04L 12/801* (2013.01)

(52) U.S. Cl.
CPC .......... *H04L 47/27* (2013.01); *H04L 69/161* (2013.01); *H04L 69/163* (2013.01); *H04L 69/321* (2013.01); *H04L 47/193* (2013.01)

(58) Field of Classification Search
CPC ....... H04L 69/16; H04L 69/22; H04L 69/161; H04L 69/163; H04L 69/166; H04L 69/168; H04L 69/169; H04L 47/10; H04L 47/12; H04L 47/14; H04L 47/27; H04L 47/193
See application file for complete search history.

(56) References Cited

U.S. PATENT DOCUMENTS

| | | | |
|---|---|---|---|
| 7,787,372 B2 * | 8/2010 | Agarwal | H04W 80/06 370/230 |
| 2005/0141419 A1 * | 6/2005 | Bergamasco | H04L 12/66 370/230 |
| 2007/0076726 A1 * | 4/2007 | Weston | H04L 47/10 370/401 |
| 2008/0298376 A1 * | 12/2008 | Takeda | |
| 2009/0154496 A1 * | 6/2009 | Fujinami | H04W 80/02 370/469 |
| 2015/0131440 A1 * | 5/2015 | Kodama | H04L 47/225 370/231 |
| 2016/0119801 A1 * | 4/2016 | Mestanov | H04W 48/06 370/252 |
| 2017/0012906 A1 * | 1/2017 | Szilagyi | H04L 49/9005 |

FOREIGN PATENT DOCUMENTS

JP 09-097223 A 4/1997

* cited by examiner

*Primary Examiner* — Peter Chen
(74) *Attorney, Agent, or Firm* — Canon U.S.A., Inc. IP Division

(57) ABSTRACT

A communication apparatus determines a size of transmission data to be input into a processing unit, which performs transmission control protocol/internet protocol (TCP/IP) processing, at one time, based on information relating to communication between the communication apparatus and another communication apparatus and information relating to a communication interface of the own apparatus.

10 Claims, 7 Drawing Sheets

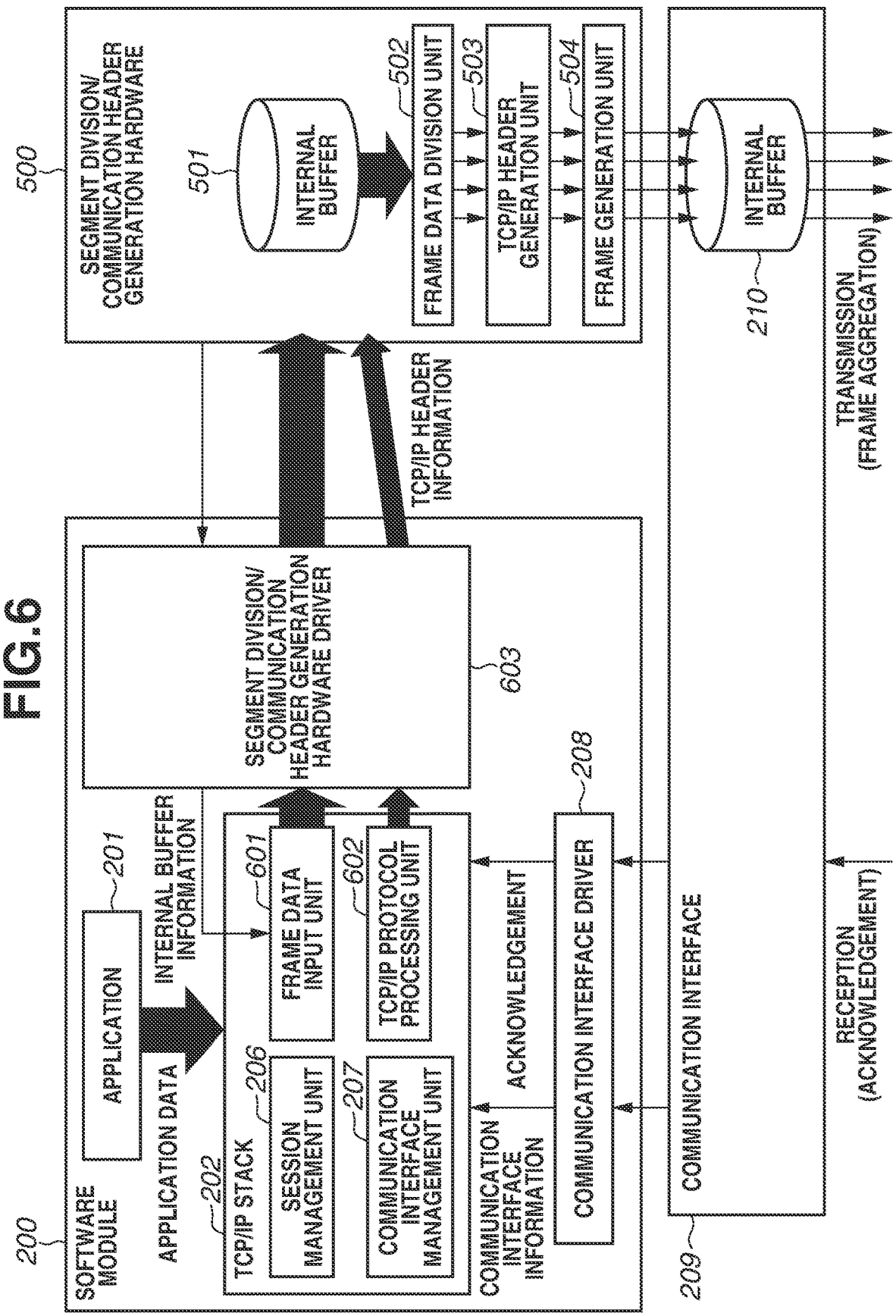

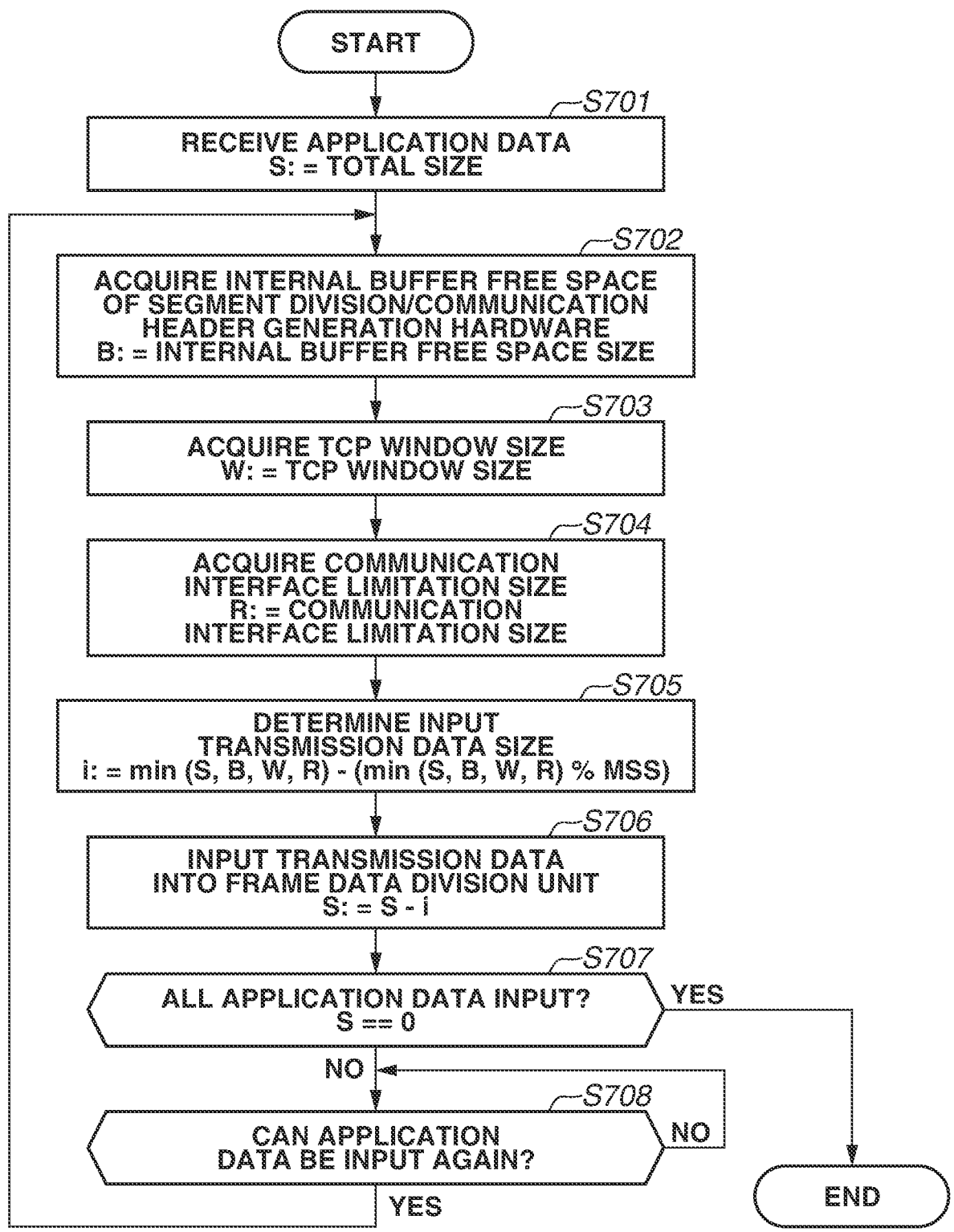

COMMUNICATION METHOD, COMMUNICATION APPARATUS, AND PROGRAM FOR REDUCING DELAY TIME OF TRANSMISSION CONTROL PROTOCOL (TCP) TRANSMISSION PROCESSING

BACKGROUND OF THE INVENTION

Field of the Invention

The present invention relates to an apparatus that performs transmission control protocol/internet protocol (TCP/IP) processing.

Description of the Related Art

In internet communication, TCP/IP is widely used as a main protocol. A transmission side of TCP communication can transmit transmission data for a window size notified by a reception side without waiting for acknowledgement. A TCP window size is normally 64 Kbytes, but the TCP window size that exceeds 64 Kbytes is supported in a case where a TCP window scale option (Japanese Patent Application Laid-Open No. 9-97223) is used.

Further, IEEE 802.11n or IEEE 802.11ac is widely used as a wireless local area network (LAN) protocol. These protocols adopt frame aggregation that improves throughput by connecting frames of identical address in a data link layer and transmitting the connected frames. The frame aggregation includes an aggregation MAC service data unit (A-MSDU) method for connecting data frames after a MAC header, and an aggregation MAC protocol data unit (A-MPDU) method for connecting MAC frames including a MAC header. In the respective protocols, maximum values of connectable data are defined, namely, 8 Kbytes for A-MSDU and 64 Kbytes for A-MPDU.

In hardware that executes TCP/IP stack and TCP/IP protocol processing, data for a TCP window size is occasionally transmitted at one time. At this time, if the TCP window scale option is used, a limitation of a communication interface such as a data connection maximum value of frame aggregation in a wireless communication protocol and an internal buffer free space can be easily exceeded.

In a case where frame data, which exceeds the data connection maximum value or the internal buffer free space of frame aggregation in the wireless communication interface dealing with the frame aggregation, is input, one-time wireless data transmission cannot finish transmission of input frame data. If the transmission of the frame data is not finished by the one-time wireless data transmission, a waiting time occurs including a time for receiving a reception response of the wireless communication protocol in the hardware that executes the TCP/IP stacking for inputting frame data or the TCP/IP protocol processing. Therefore, parallelism of entire TCP transmission processing is deteriorated, and a redundant delay occurs.

SUMMARY OF THE INVENTION

The present invention is directed to a reduction in a delay time of entire TCP transmission processing.

A communication apparatus of the present invention includes a one or more first processors configured to perform processing relating to a transmission control protocol (TCP) on input transmission data, a communication interface configured to transmit a transmission frame including the transmission data processed by the one or more first processors to another communication apparatus, and one or more second processors that determine a size of the transmission data to be input into the one or more first processors at one time, based on first information relating to communication between the communication apparatus and the another communication apparatus, second information relating to the one or more first processors, and third information which includes information based on a free space of an internal buffer of the communication interface.

Further features of the present invention will become apparent from the following description of exemplary embodiments with reference to the attached drawings.

BRIEF DESCRIPTION OF THE DRAWINGS

FIG. 6 is a configuration example of a software module to be mounted on the communication apparatus and a configuration example of segment division/communication header generation hardware according to the second exemplary embodiment.

FIG. 7 is a flowchart for determining an input transmission data size according to the second exemplary embodiment.

DESCRIPTION OF THE EMBODIMENTS

The present invention will be described in detail below based on examples of exemplary embodiments with reference to the accompanying drawings. Configurations described below in the exemplary embodiments are only examples, and the present invention is not limited to the illustrated configurations.

A communication apparatus 100 according to a first exemplary embodiment performs data communication with a reception apparatus (another communication apparatus) (not illustrated) in conformity with a transmission control protocol/internet protocol (TCP/IP).

Figure 1:
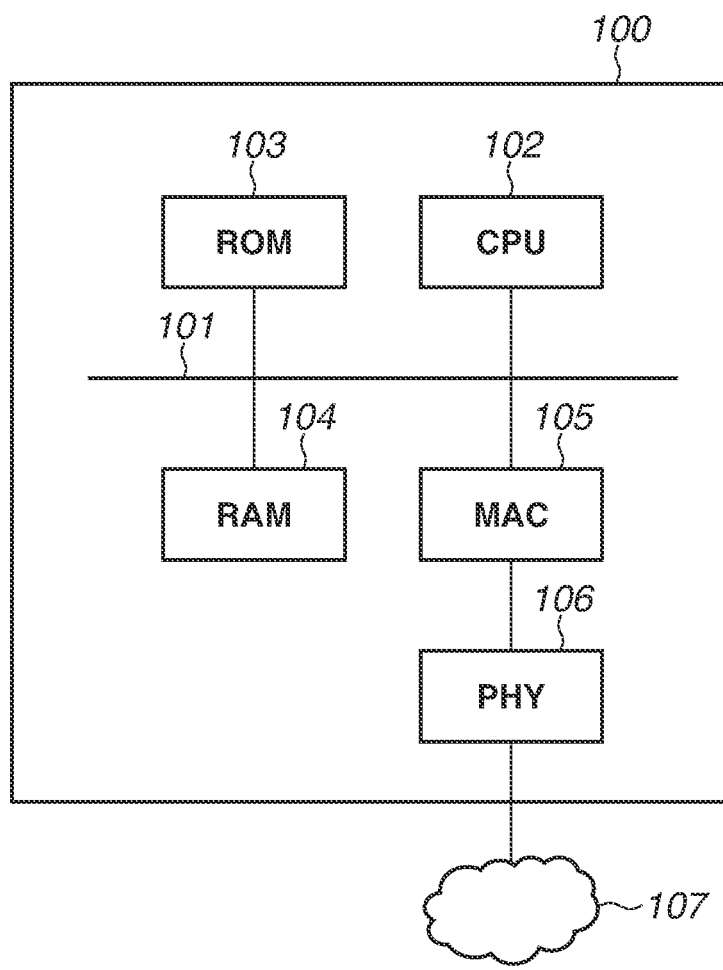
FIG. 1 is a hardware configuration example of a communication apparatus according to a first exemplary embodiment.

FIG. 1 illustrates a hardware configuration of the communication apparatus 100. A system bus 101 connects a central processing unit (CPU) 102, a read only memory (ROM) 103, and a random access memory (RAM) 104 to be a transfer path for various data. The CPU 102 controls respective hardware configuration units in an integrated manner, and entirely controls the communication apparatus 100. The ROM 103 stores a control program and the like to be executed by the CPU 102.

The RAM 104 functions as a main memory and a work area of the CPU 102, and temporarily stores a program and data. The RAM 104 has an application buffer (not illustrated) that stores an application data, and a network buffer (not illustrated) that stores packet data. A media access control (MAC) 105 is a communication unit that executes communication processing related to a MAC layer and a physical (PHY) layer. In the present exemplary embodiment, the MAC 105 is a wireless local area network (LAN) module that performs wireless communication (wireless fidelity (Wi-Fi) communication) conforming to an IEEE 802.11 series, but the MAC 105 is not limited to this. For example, the MAC 105 may be a wired LAN module that performs wired communication conforming to Ethernet (registered trade name). A network 107 is a network that enables IP communication such as Ethernet or Wi-Fi communication.

Figure 2:
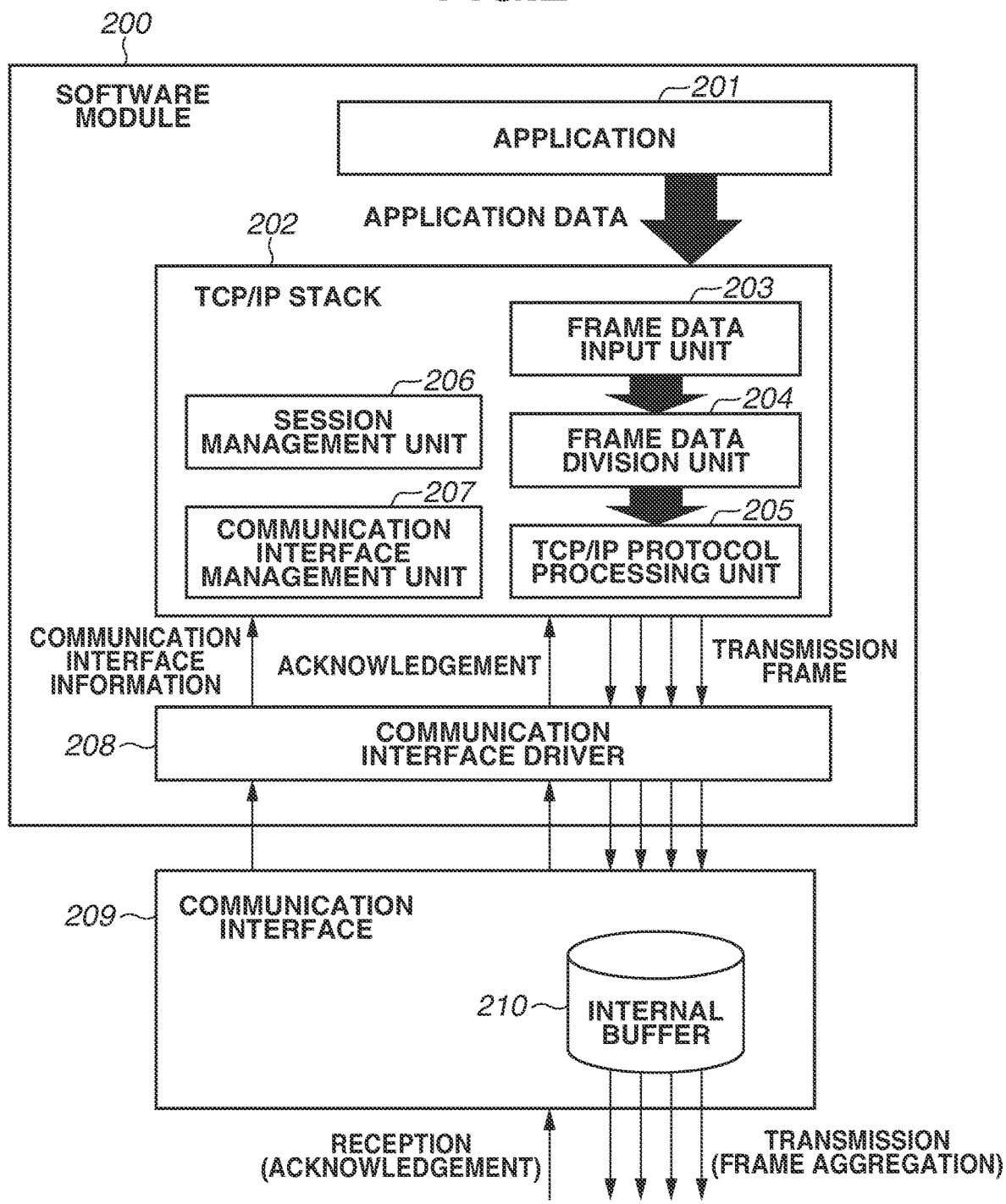
FIG. 2 is a configuration example of a software module to be mounted on the communication apparatus according to the first exemplary embodiment.

FIG. 2 is a software block diagram illustrating an internal configuration of a software module 200 to be realized in the communication apparatus 100. The software module 200 is realized in a manner that the CPU 102 executes the control program stored in the ROM 103.

The application 201 is a user application. The application 201 inputs application data of any size to be transmitted to the reception apparatus (not illustrated) of a partner device, which communicates with the communication apparatus 100, into a TCP/IP stack 202. The TCP/IP stack 202 includes a frame data input unit 203, a frame data division unit 204, a TCP/IP protocol processing unit 205, a session management unit 206, and a communication interface management unit 207.

The frame data input unit 203 determines a size of transmission data to be input at one time into the frame data division unit 204, based on a TCP window size managed by the session management unit 206 and a communication interface limitation size managed by the communication interface management unit 207. Details of a method for determining the size of transmission data to be input at one time will be described below.

The frame data division unit 204 divides the input transmission data into pieces with a unit size which is a TCP maximum segment size or less. The respective pieces of transmission data divided by the frame data division unit 204 become payloads of TCP frames, namely, so-called TCP segments.

The TCP/IP protocol processing unit 205 generates TCP headers and IP headers related to the divided TCP segments and performs checksum calculation associated with the headers to generate a transmission frame. The TCP/IP protocol processing unit 205 inputs the generated transmission frame to a communication interface driver 208.

The communication interface driver 208 is driver software of a communication interface 209, and performs data and information exchange between the TCP/IP stack 202 and the communication interface 209. The communication interface 209 is hardware that communicates directly with the external network 107, and an internal buffer 210 of the communication interface 209 holds the frame data.

The communication apparatus 100 transmits a transmission frame conforming to TCP/IP to the reception apparatus via the communication interface 209. The communication apparatus 100 receives an acknowledgement frame (ACK conforming to TCP) confirming the transmission frame from the reception apparatus via the communication interface 209. The acknowledgement frame includes a TCP window size in a TCP session between the communication apparatus 100 and the reception apparatus.

Upon reception of the acknowledgement frame from the reception apparatus, the communication interface driver 208 transfers the received acknowledgement frame to the session management unit 206. The session management unit 206 acquires the TCP window size of the TCP session from the acknowledgement frame received from the communication interface driver 208 to manage the TCP window size.

The communication interface management unit 207 calculates and manages a communication interface limitation size based on communication interface information received from the communication interface driver 208, such as a free space of the internal buffer 210 and information about a frame aggregation mode. Details of a method for calculating the communication interface limitation size will be described below.

Figure 3:
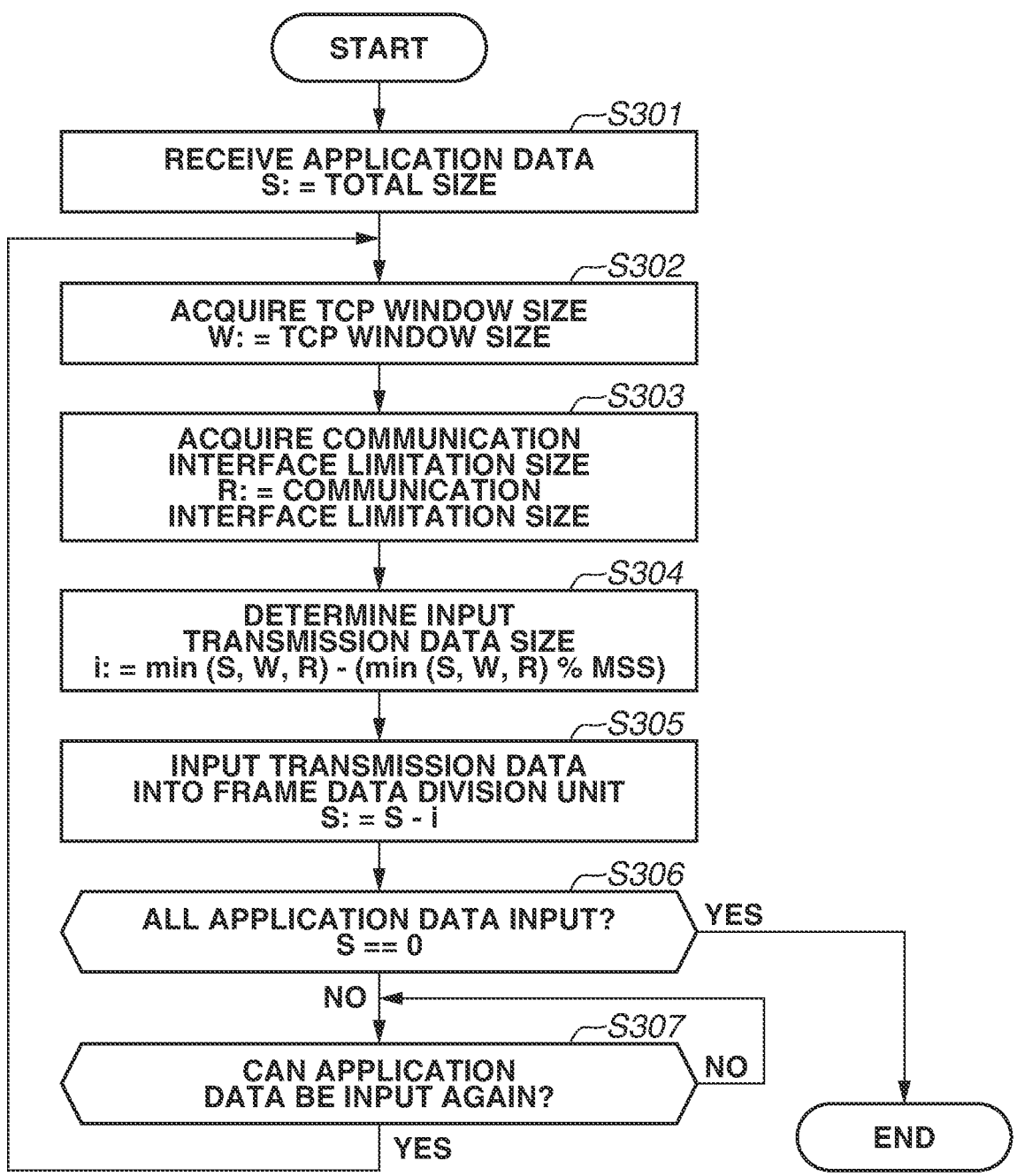
FIG. 3 is a flowchart for determining an input transmission data size according to the first exemplary embodiment.

FIG. 3 is a flowchart illustrating a method for inputting the transmission data into the frame data division unit 204 including a method for determining the input transmission data size in the frame data input unit 203.

FIG. 3 illustrates a flowchart of processing to be realized by the CPU 102 reading out the program stored in the ROM 103 and executing the program in a case where the communication apparatus 100 transmits data to the reception apparatus.

At least a part of the flowchart illustrated in FIG. 3 may be realized by hardware. In a case where the part of the flowchart is realized by hardware, for example, a dedicated circuit may be automatically formed on a field-programmable gate array (FPGA) based on the program for realizing each step by using a predetermined compiler. Further, the part of the flowchart may be realized as hardware by forming a gate array circuit similarly to FPGA. Further, the part of the flowchart may be realized by an application specific integrated circuit (ASIC).

In step S301, the frame data input unit 203 receives application data from the application 201. A total size of the received application data is defined as S.

In step S302, the frame data input unit 203 acquires a TCP window size managed by the session management unit 206. The acquired TCP window size is taken as W.

In step S303, the frame data input unit 203 acquires a communication interface limitation size managed by the communication interface management unit 207. The acquired communication interface limitation size is taken as R.

In step S304, the frame data input unit 203 determines an input transmission data size. The frame data input unit 203 sets a maximum value that is a minimum value or less of the total size S of the application data, the TCP window size W, and the communication interface limitation size R, and is a multiple of a TCP maximum segment size (MSS), as an input transmission data size i. If the minimum value of the total size S of the application data, the TCP window size W, and the communication interface limitation size R does not reach the TCP maximum segment size (min (S, W, R)<MSS), the minimum value is set as the input transmission data size i.

The TCP maximum segment size is determined when a TCP session is established between the communication apparatus 100 and the reception apparatus through 3-way handshake, and is stored in the RAM 104. Herein, the frame data input unit 203 reads and acquires the TCP maximum segment size from the RAM 104 when the input transmission data size is determined.

Further, the determining method is not limited to the above, for example, the multiple of the TCP maximum segment size does not have to be taken into consideration. In this case, the frame data input unit 203 sets the minimum value of the total size S of the application data, the TCP window size W, and the communication interface limitation size R as the input transmission data size i.

In step S305, the frame data input unit 203 inputs transmission data into the frame data division unit 204 by the input transmission data size i. An application data size S is updated every time transmission data is input (S:=S−i). That is, S indicates the application data size that is not yet input into the frame data division unit 204 (residual application data size).

In step S306, the frame data input unit 203 checks whether all the application data has been already input into the frame data division unit 204 (S=0). If all the application data is input (Yes in step S306), the processing illustrated in FIG. 3 is ended. On the other hand, if application data which has not been input remains (No in step S306), the processing proceeds to step S307.

In step S307, the frame data input unit 203 waits until application data can be input again. If all the transmission data input into the frame data division unit 204 has been transmitted, the frame data input unit 203 determines that the application data can be input again into the frame data division unit 204. The word "has been transmitted" means that the communication interface 209 has finished transmitting the data. Alternatively, the above word may indicate a case where the TCP/IP stack 202 has finished transmitting the data to the communication interface 209. If the application data can be input again (Yes in step S307), the processing proceeds to step S302.

Figure 4:
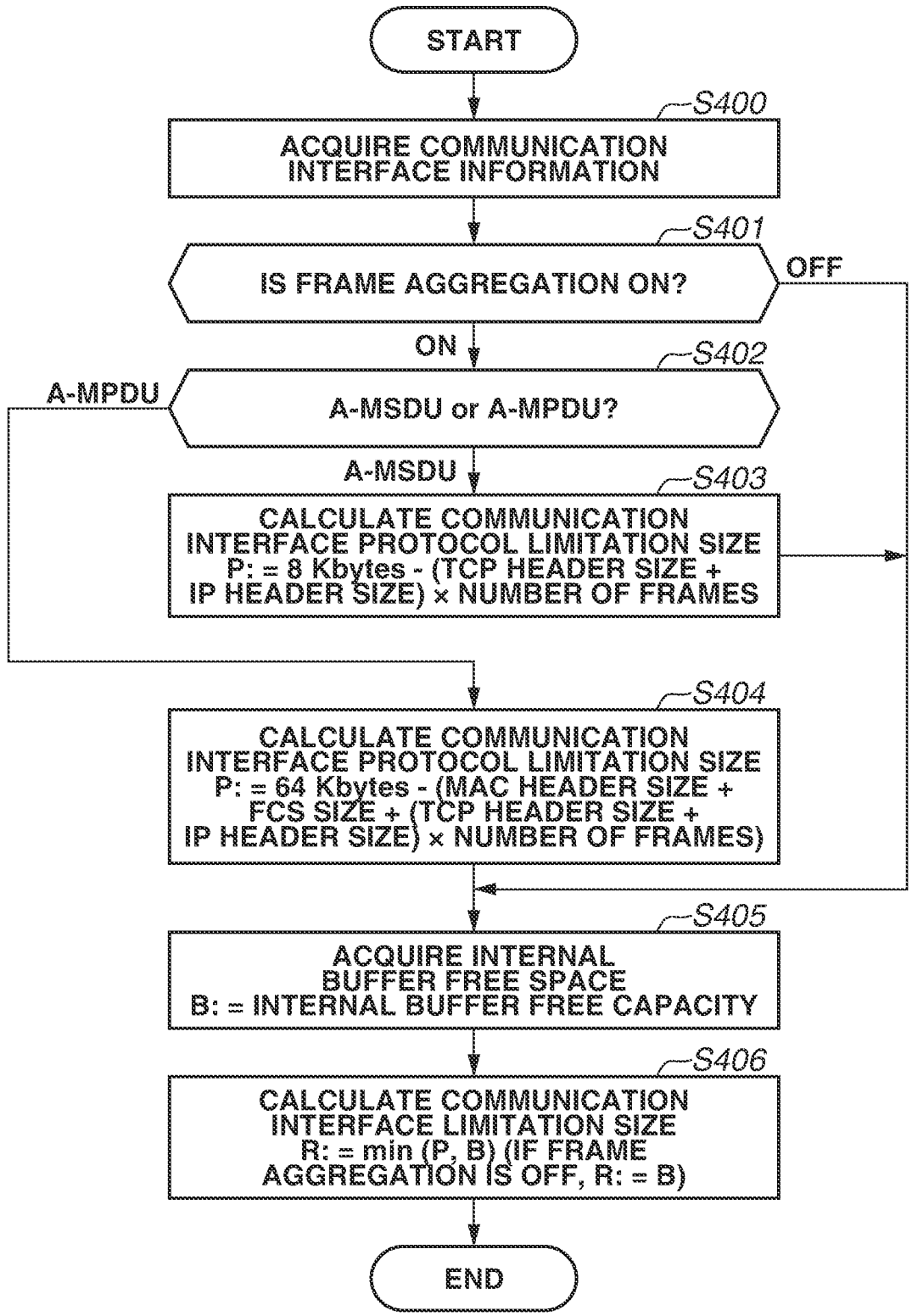
FIG. 4 is a flowchart for determining a communication interface limitation size according to the first exemplary embodiment.

FIG. 4 is a flowchart illustrating a method for calculating the communication interface limitation size in the communication interface management unit 207. The flowchart starts at a moment when the frame data input unit 203 receives data from the application 201. Alternatively, the flowchart may start at the moment when a predetermined interrupt occurs from the communication interface 209. The predetermined interrupt means, for example, notification of the completion of data transmission (a free space of the internal buffer 210 changes) or notification of a change in aggregation setting.

The flowchart is realized by the CPU 102 reading out the program stored in the ROM 103 and executing the program.

In step S400, the communication interface management unit 207 acquires the communication interface information of the communication interface 209 via the communication interface driver 208.

In step S401, the communication interface management unit 207 determines a use state of a frame aggregation function, namely, whether the frame aggregation is enabled. The communication interface 209 sets whether to enable the frame aggregation based on a communication status (an error rate or received signal strength). The determination whether the frame aggregation is enabled or not, can be made by the communication interface management unit 207 managing the communication status.

As a result of the determination, if the frame aggregation is enabled (Yes in step S401), the processing proceeds to step S402, but if not enabled (No in step S401), the processing proceeds to step S405.

In step S402, the communication interface management unit 207 determines whether a frame aggregation mode is an aggregation MAC service data unit (A-MSDU) or an aggregation MAC protocol data unit (A-MPDU). A unit to be used may be preset, or may be switched based on a communication status or the like. In a case where only one of A-MSDU and A-MPDU is supported as a device for data transmission, this step can be omitted, and the processing may proceed to a flow of a supported mode. In this case, a flow related only to the other mode may be omitted, and an operation related to this flow does not necessarily have to be performed as a device.

In a case of A-MSDU, the processing proceeds to step S403, and in a case of A-MPDU, the processing proceeds to step S404.

In step S403, the communication interface management unit 207 calculates a communication interface protocol limitation size P of A-MSDU. Specifically, in A-MSDU, the communication interface management unit 207 calculates a value obtained by subtracting a size, which is obtained by multiplying a sum of a communication protocol overhead size by the number of frames, from 8 Kbytes which is a connection size of a packet which can be transmitted at one time without waiting for a reception response (acknowledgement (ACK)). The calculated value is determined as the communication interface protocol limitation size P. The communication protocol overhead size in step S403 is a total value of a TCP header size and an IP header size.

The number of frames here is determined so that the IP packet size obtained by summing up the TCP maximum segment size, the TCP header size, and the IP header size becomes the largest but is within 8 Kbytes. Thereafter, the processing proceeds to step S405.

In step S404, the communication interface management unit 207 calculates the communication interface protocol limitation size P of A-MPDU. More specifically, in A-MPDU, the communication interface management unit 207 makes a calculation by way of subtracting the size obtained by multiplying the sum of the communication protocol overhead size by the number of frames, from 64 Kbytes which is an interlinked size of a packet which can be transmitted at one time without waiting for a reception response. The calculated value is determined as the communication interface protocol limitation size P. The communication protocol overhead size in step S404 is a total value of a MAC header size, a frame check sequence size, the TCP header size, and the IP header size.

Further, the number of frames is set so that the IP packet size obtained by summing up the TCP maximum segment size, the TCP header size, and the IP header size becomes the largest, but is within a value obtained by subtracting the MAC header size and the frame check sequence size from 64 Kbytes. Thereafter, the processing proceeds to step S405.

In step S405, the communication interface management unit 207 acquires free space B of the internal buffer 210.

In step S406, the communication interface management unit 207 calculates the communication interface limitation size R. As the communication interface limitation size R, the communication interface protocol limitation size P or the internal buffer free space B, whichever is smaller, is set in a case where the frame aggregation is enabled. In a case where the frame aggregation is not enabled, the internal buffer free space B is set directly as the communication interface limitation size R.

In the present exemplary embodiment, the input transmission data size is determined in consideration of both the internal buffer free space of the communication interface and the frame aggregation size. However, instead of the present embodiment, only one of them may be a consideration object. Further, in the description, the wireless communication protocol is IEEE 802.11n, but another wireless communication protocol or a wired communication protocol may be used. Further, the communication interface limitation size is calculated for every time, but in a case where the enablement/disablement of the frame aggregation and the frame aggregation mode are statically determined, the communication interface limitation size may be set as a fixed value in advance.

In such a manner, the size of transmission data which is input into the TCP/IP stack 202 at one time is determined based on the TCP window size, the use status of the aggregation of the communication interface 209, and the free space of the internal buffer 210. As a result, a plurality of TCP connections is established, and even if the TCP/IP stack 202 must execute parallel processing, efficient parallelism of the entire TCP transmission processing can be maintained. This can reduce a time during which the TCP/IP stack 202 cannot execute another TCP connection processing due to a waiting time for the transmission processing for one TCP connection.

In addition, the apparatus may also be configured such that in a case where a plurality of TCP connections is established, the above-described exemplary embodiment is carried out, and in a case where only one TCP connection is established, the above-described exemplary embodiment is not carried out. In this case, the input transmission data size is determined as the TCP window size, and all the application data received in step S301 is input into the TCP/IP stack 202 at one time. Such a switching process enables flexible control according to the number of TCP connections.

A second exemplary embodiment will be described below. In the first exemplary embodiment, the frame data division processing and the frame generation processing have been executed by the software module. In the second exemplary embodiment, a part of the TCP/IP protocol processing which includes the frame data division processing and the TCP/IP header generation processing as well as the frame generation processing is executed by another hardware.

Figure 5:
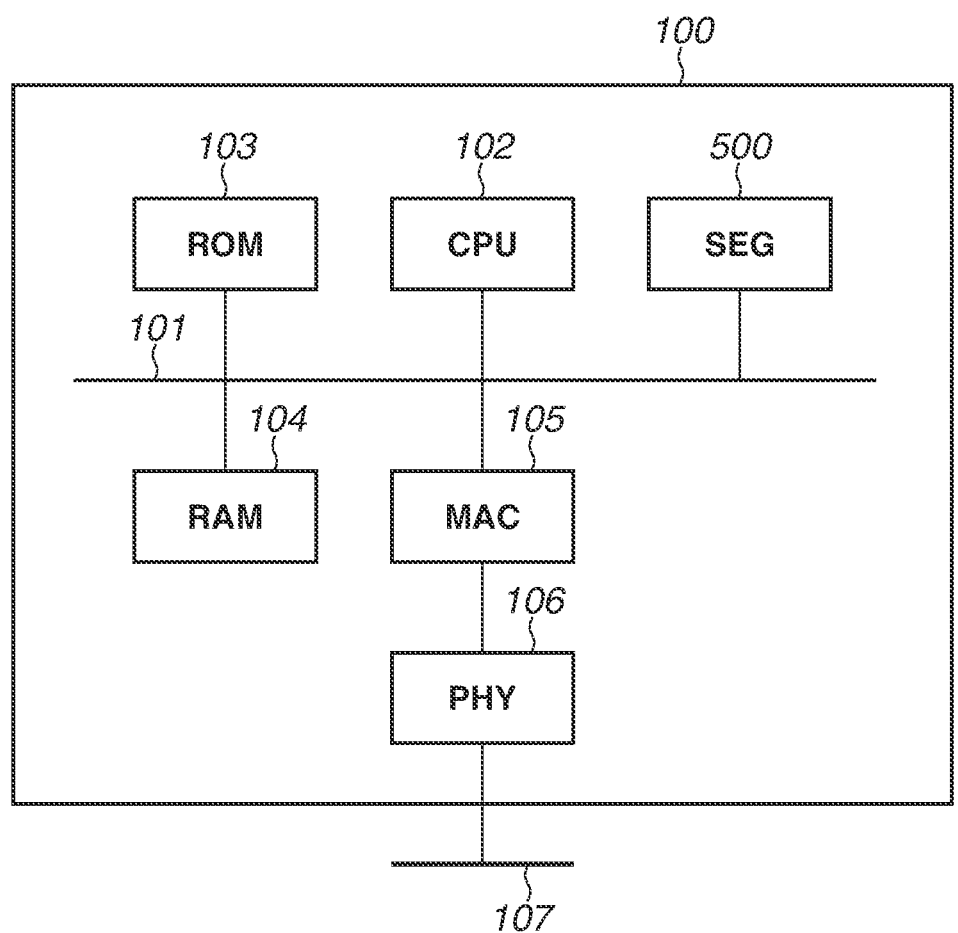
FIG. 5 is a hardware configuration example of the communication apparatus according to a second exemplary embodiment.

FIG. 5 is a block diagram illustrating a hardware configuration example of the communication apparatus 100 according to the present exemplary embodiment. Segment division/communication header generation hardware 500 is hardware that executes the frame data division processing, the TCP/IP header generation processing, and the frame generation processing which have been executed by the software in the first exemplary embodiment. Since the other part of hardware configuration is similar to the configuration in the first exemplary embodiment, description thereof is omitted.

FIG. 6 is a block diagram including an internal configuration of the software module 200 mounted on the communication apparatus 100 and an internal configuration of the segment division/communication header generation hardware 500 according to the present exemplary embodiment.

A frame data input unit 601 in the TCP/IP stack 202 determines a size of input transmission data to be input into the segment division/communication header generation hardware 500 based on the application data received from the application 201. The input transmission data size is determined based on the TCP window size managed by the session management unit 206, the communication interface limitation size managed by the communication interface management unit 207, and a free space of an internal buffer 501. Details of a method for determining the input transmission data size will be described below. Transmission data of the determined input transmission data size is input into the segment division/communication header generation hardware 500. A TCP/IP protocol processing unit 602 generates information, such as sequence numbers, time stamps, port numbers, which are necessary for generating a TCP header and an IP header, or a template header in which such information is stored, and inputs the information or the template header into the segment division/communication header generation hardware 500. A segment division/communication header generation hardware driver 603 is a driver of the segment division/communication header generation hardware 500, and mediates hardware control or data exchange with the frame data input unit 601 and the TCP/IP protocol processing unit 602.

The segment division/communication header generation hardware 500 includes the internal buffer 501, a frame data division unit 502, a TCP/IP header generation unit 503, and the frame generation unit 504. The internal buffer 501 is a buffer for temporarily saving transmission data input from a frame data input unit 601. The frame data division unit 502 divides the transmission data saved in the internal buffer 501 into TCP segments by unit, which is the TCP maximum segment size or less. The TCP/IP header generation unit 503 generates a TCP/IP header based on TCP/IP header information input from the TCP/IP protocol processing unit 602. Specifically, the TCP/IP header generation unit 503 performs a calculation of a sequence number according to a divided TCP segment size and a checksum calculation including the divided TCP segment to generate a TCP header and an IP header. The frame generation unit 504 combines the TCP segment divided by the frame data division unit 502 with the TCP/IP header generated by the TCP/IP header generation unit 503 to generate a transmission frame. The generated transmission frame is input into the internal buffer 210 of the communication interface 209. Input control of the transmission frame may be made by the communication interface driver 208.

Since the other part of the configuration is similar to the configuration in the first exemplary embodiment, description thereof is omitted.

FIG. 7 is a flowchart illustrating a method for inputting transmission data into the segment division/communication header generation hardware 500 including a method for determining the input transmission data size in the frame data input unit 601. The flowchart is realized by the CPU 102 reading out the program stored in the ROM 103 and executing the program, in a case where the communication apparatus 100 transmits data to the reception apparatus.

In step S701, the frame data input unit 601 receives application data from the application 201, and sets the total size of the received application data as S.

In step S702, the frame data input unit 601 acquires a free space of the internal buffer 501 of the segment division/communication header generation hardware 500, and sets the acquired free space as B.

In step S703, the frame data input unit 601 acquires a TCP window size managed by the session management unit 206. The acquired TCP window size is set as W.

In step S704, the frame data input unit 601 acquires a communication interface limitation size managed by the communication interface management unit 207. The acquired communication interface limitation size is set as R.

In step S705, the frame data input unit 601 determines an input transmission data size. As the input transmission data size i, the frame data input unit 601 sets a value, which is a minimum value or less of the total size S of the application data, the internal buffer free space B, the TCP window size W, and the communication interface limitation size R, and is a maximum value that is a multiple of a TCP maximum segment size. If the minimum value of the total size S of the application data, the TCP window size W, and the communication interface limitation size R is less than TCP maximum segment size, the frame data input unit 601 sets this minimum value as the input transmission data size i. The determining method is not limited to this method, for example, the multiple of the TCP maximum segment size does not have to be taken into consideration.

In step S706, the frame data input unit 601 inputs transmission data into the segment division/communication header generation hardware 500 via the segment division/communication header generation hardware driver 603. The frame data input unit 601 then updates the application data size S (S:=S−i).

In step S707, the frame data input unit 601 checks whether input of all the application data is completed (S==0), and if completed (Yes in step S707), the processing ends. If application data which has not been input remains (No in step S707), the processing proceeds to step S708.

In step S708, the frame data input unit 601 waits until the application data can be input again. The application data can be input again in a case where, for example, the internal buffer 501 of the segment division/communication header generation hardware 500 has a sufficient free space, or all input transmission data has been transmitted. If the application data can be input again (Yes in step S708), the processing proceeds to step S702.

Since the method for calculating the communication interface limitation size in the communication interface management unit 207 is similar to the method in the first exemplary embodiment, description thereof is omitted.

In the present exemplary embodiment, the configuration including the hardware, which executes the segment division processing, and the communication header generation processing has been described. However, the hardware may also execute only one of the segment division processing and the communication header generation processing or may execute another processing.

The present invention can be realized also by providing the program which achieves one or more functions in the above-described exemplary embodiments to the system or the apparatus via a network or a storage medium and reading out the program into one or more processors in a computer of the system or the apparatus to execute the program. Further, the present invention can be realized also by a circuit which achieves one or more functions (for example, ASIC).

According to the present invention, a delay time of the entire TCP transmission processing can be shortened.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-035935, filed Feb. 28, 2017, which is hereby incorporated by reference herein in its entirety.

What is claimed is:

1. A communication apparatus comprising:
one or more first processors that perform processing relating to a transmission control protocol (TCP) on input transmission data;
a communication interface configured to transmit a transmission frame including the transmission data processed by the one or more first processors to another communication apparatus; and
one or more second processors that determine a size of the transmission data to be input into the one or more first processors at one time, based on information having a smallest size among the following information:
first information relating to a TCP window size of the another communication apparatus;
second information relating to a size of a free space of a buffer used in TCP processing performed by the one or more first processors; and
third information relating to a size according to a protocol of communication performed via the communication interface,
wherein the third information includes information based on a communication protocol overhead size.

2. The communication apparatus according to claim 1, wherein the communication interface receives an acknowledgement frame with respect to the transmission frame, from the another communication apparatus.

3. The communication apparatus according to claim 2, wherein the first information includes information based on a TCP window size included in the acknowledgement frame.

4. The communication apparatus according to claim 1, wherein the protocol is a protocol relating to frame aggregation.

5. The communication apparatus according to claim 4, wherein the protocol relating to frame aggregation is a protocol corresponding to an aggregation MAC (Media Access Control) service data unit (A-MSDU) mode or an aggregation MAC protocol data unit (A-MPDU) mode.

6. The communication apparatus according to claim 1, wherein the communication protocol overhead size includes at least one of a TCP header size, an (internet protocol) IP header size, a media access control (MAC) header size, and a frame check sequence size.

7. The communication apparatus according to claim 1, wherein the one or more second processors determines the size which is smaller than a TCP window size and is a multiple of a TCP maximum segment size as the size of the transmission data to be input into the one or more first processors at one time.

8. The communication apparatus according to claim 1, wherein the one or more second processors determines a size which is smaller of a TCP window size and a free space of an internal buffer of the communication interface, and is a multiple of a TCP maximum segment size, as the size of the transmission data to be input into the one or more first processors at one time.

9. The communication apparatus according to claim 1, wherein the one or more second processors determines a size, which is the smallest of a TCP window size, a free space of an internal buffer of the communication interface, and a size based on a use state of a frame aggregation function when the communication interface transmits the transmission frame, and is a multiple of a TCP maximum segment size, as the size of the transmission data to be input into the one or more first processors at one time.

10. A control method for a communication apparatus including one or more processors that performs processing relating to a transmission control protocol (TCP) on transmission data, and a communication interface configured to transmit a transmission frame including the transmission data processes by the one or more processors to another communication apparatus, the control method comprising:
  determining a size of data to be input into the one or more processors at one time as the transmission data, based on information having a smallest size among the following information:
    first information relating to a TCP window size of the another communication apparatus;
    second information relating to a size of a free space of a buffer used in TCP processing performed by the one or more processor; and
    third information relating to a size according to a protocol of communication performed via the communication interface,
    wherein the third information includes information based on a communication protocol overhead size; and
  inputting the transmission data of the determined size to the one or more processors.

* * * * *